United States Patent [19]

Daublebsky

[11] 4,053,080

[45] Oct. 11, 1977

[54] PROTECTIVE DEVICE AGAINST RUPTURE OF LARGE CYLINDRICAL VESSELS AND METHOD OF MANUFACTURING SAME

[75] Inventor: Peter Daublebsky, Frankfurt am Main, Germany

[73] Assignee: Kraftwerk Union Aktiengesellschaft, Mulheim (Ruhr), Germany

[21] Appl. No.: 509,920

[22] Filed: Sept. 27, 1974

[30] Foreign Application Priority Data

Oct. 2, 1973 Germany .............. 2349518

[51] Int. Cl.² .............................. B65D 7/44
[52] U.S. Cl. ...................... 220/3; 52/249; 220/63 R; 220/71
[58] Field of Search .......... 220/3, 9 A, 9 LG, 10, 220/63 R, 71, 5 A; 138/140, 141, 142, 199, 152, 164, 172, 174, 175, 153, 143, 149; 52/249; 176/87

[56] References Cited

U.S. PATENT DOCUMENTS

| 485,000 | 10/1892 | Curtis et al. .................. 138/147 |
| 528,399 | 10/1894 | Stebbins ....................... 52/249 |
| 631,328 | 8/1899 | Rowe .......................... 138/140 |
| 1,453,516 | 5/1923 | Payson ....................... 220/63 R |
| 1,609,858 | 12/1926 | Bohon ......................... 220/9 A |
| 1,661,254 | 3/1928 | Gillies ........................ 138/153 |
| 1,755,176 | 4/1930 | Feldmeier .................... 220/9 A |
| 1,925,118 | 9/1933 | Stresau ......................... 220/3 |
| 1,940,277 | 12/1933 | Stresau ..................... 220/63 R |
| 2,217,090 | 10/1940 | Zerbe ........................... 220/3 |
| 2,360,391 | 10/1944 | Birchall ........................ 220/3 |
| 2,376,351 | 5/1945 | Gay ............................. 220/3 |
| 2,451,145 | 10/1948 | Baker et al. ................... 52/249 |
| 3,027,039 | 3/1962 | Lakin et al. .................... 220/3 |
| 3,491,910 | 1/1970 | Buckwalter et al. .......... 220/9 LG |
| 3,503,171 | 3/1970 | Frohly ......................... 52/249 |

Primary Examiner—George E. Lowrance
Assistant Examiner—Allan N. Shoap
Attorney, Agent, or Firm—Herbert L. Lerner

[57] ABSTRACT

A cylindrical steel vessel for nuclear reactors having a cover and a bottom wall is provided with a protective device against axial rupture of the vessel that includes tensioning members which connect a second cover and a second bottom or base one to the other. Also included are a plurality of rings, respectively formed of a sheet metal wrapping, wound around the cylindrical part of the vessel. Between the sheet metal wrapping and the vessel there is a filler of removable light concrete for thermal insulation and shock absorption in the event of a rupture of the vessel. Also disclosed is a method of manufacturing the protective device.

3 Claims, 3 Drawing Figures

PROTECTIVE DEVICE AGAINST RUPTURE OF LARGE CYLINDRICAL VESSELS AND METHOD OF MANUFACTURING SAME

The invention relates to protective device against rupture of large cylindrical vessels and the method of manufacture thereof. Large cylindrical vessels which, as pressure vessels, must be able to withstand great pressures and high temperatures over extended periods of time, are reqired especially in nuclear reactors for receiving nuclear reactor fuel rods.

When a rupture of such a vessel occurs, considerable destruction can result therefrom. In order to limit such damage, it has been known heretofore to equip such vessel with a protective device against rupture. Such a protective device is formed generally of an additional or auxiliary vessel made up of rings which surrounds the large vessel proper and which absorbs the internal pressure in the event of the rupture of the large vessel.

It is an object of the invention of the instant application to provide a protective device of the aforementioned heretofore known type which surrounds a large cylindrical vessel, without requiring the transport of heavy vessel parts to the installation site nor costly assembly of the protective device against rupture of the vessel.

The protective device against rupture according to the invention is suited for substantially cylindrical vessels having a second cover and a second bottom wall forming a protective device against axial rupture of the vessel, the second cover and second bottom wall being tied together by tensioning members or tie rods, so that any remaining protective device is required virtually only to absorb forces acting in radial direction, and not, however, in axial direction.

With the foregoing and other object in view, there is provided in accordance with the invention a protective device which protects against forces acting in radial direction as a result of the rupture of a large cylindrical vessel.

More specifically in accordance with the invention, there is provided a protective device against rupture of a large cylindrical vessel having a second cover and a second bottom wall and tensioning members mutually connecting the second cover and the second bottom wall, comprising superimposed rings formed of respective sheet-metal wrappings each having a plurality of turns wound about the cylindrical part of the vessel between the second cover and the second bottom wall thereof.

In accordance with another feature of the invention, the protective device includes outer sheet-metal wrappings wound around the first-mentioned sheet-metal wrapping and staggered with respect thereto in axial direction.

In accordance with a further feature of the invention, the sheet-metal wrappings are formed of respective metal sheets having ends welded to the turn of the sheet-metal wrapping next adjacent thereto.

In accordance with a further feature of the method of the invention the profiled rails are connected one to another by sheet-metal segments whereon the sheet-metal wrapping is wound, the screw means including screws and respective turnbuckles connecting the sheet-metal segments to the profiled rails, and the turnbuckles are adjusted so as to shift the sheet-metal segments radially from the sheet-metal wrapping wound thereon.

In accordance with an additional feature of the invention the sheet-metal wrappings have an inner diameter greater than the outer diameter of the large cylindrical vessel the rupture of which is being protected against, the space between said sheet-metal wrappings and the large cylindrical vessel being filled with light concrete segments.

In accordance with one mode of the method of the invention for manufacturing the protective device there is placed around the cylindrical vessel a plurality of mutually spaced-apart profiled rails defining a slide form, the profiled rails are braced against the cylindrical vessel with radially directed screw means distributed about the peripheral surface of the cylindrical vessel, a metal sheet is wound around the slide form defined by the profiled rails so as to form a sheet-metal wrapping theron; and thereafter the profiled rails are shifted on the cylindrical vessel for use again to produce a next inner sheet-metal wrapping.

In accordance with another mode of the method of manufacturing a sheet-metal wrapping according to the invention, a plurality of mutually spaced-apart profiled rails are placed around a rotatable drum standing substantially upright. The profiled rails are braced against the drum with radially directed screw means distributed about the peripheral surface of the drum so that the profiled rails are removable by suitable adjustment of the screw means after winding a sheet-metal wrapping about the drum by rotating the latter, then the completed sheet-metal wrapping is slid over the large cylindrical vessel the rupture of which is being protected against, and the sheet-metal wrapping is wedged on the cylindrical vessel.

Other features which are considered as characteristic for the invention are set forth in the appended claims.

Although the invention is illustrated and described herein as protective device against rupture of large cylindrical vessels and method of manufacturing same, it is nevertheless not intended to be limited to the details shown, since various modificatins may be made therein without departing from the spirit of the invention and within the scope and range of equivalents of the claims.

The invention, however, together with additional objects and disadvantages thereof will be best understood from the following description when read in connection with the accompanying drawing, in which.

Figures 1, 1A:
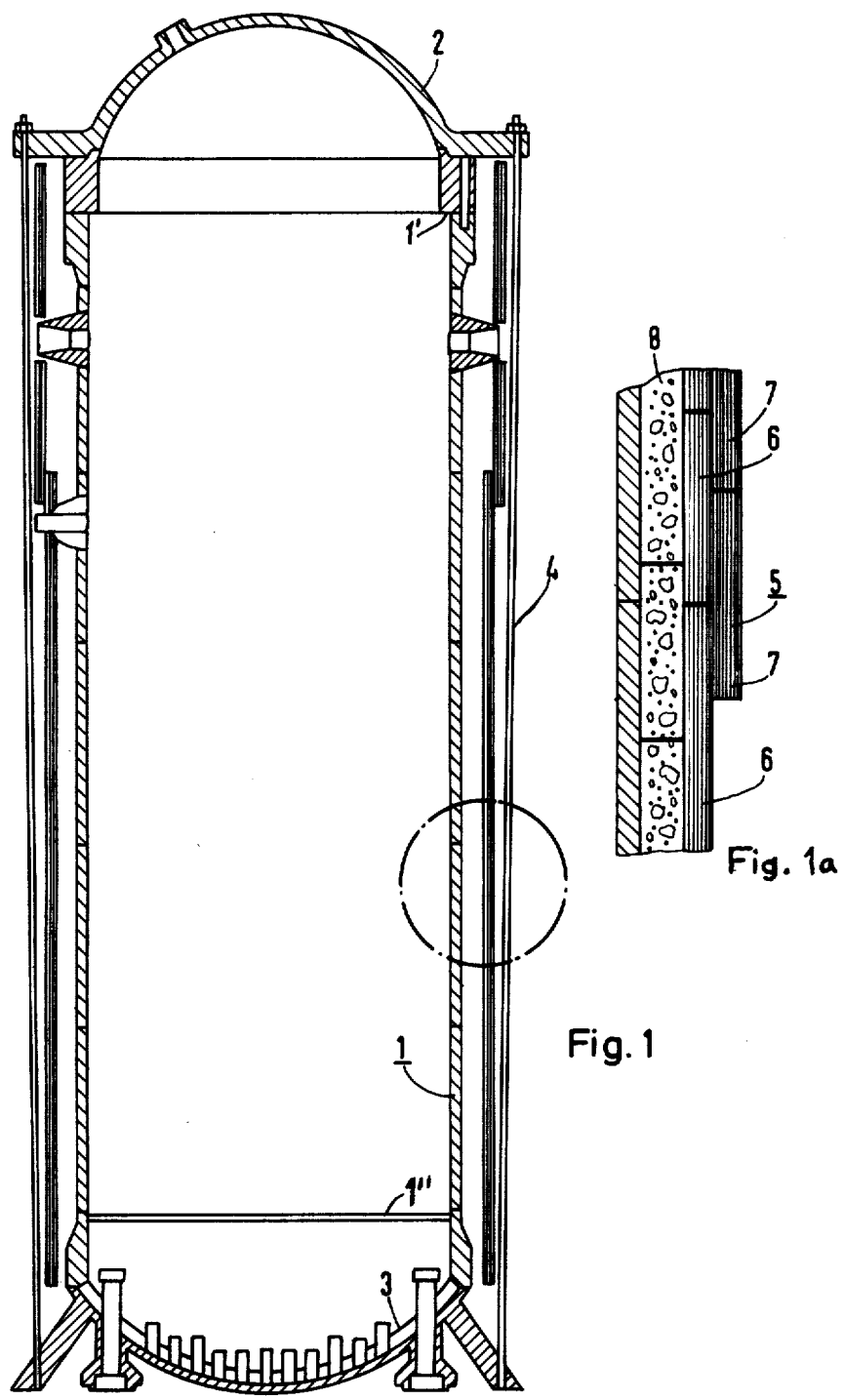
FIG. 1 is a diagrammatic vertical sectional view of a large cylindrical vessel having a second cover and a second bottom wall and tensioning members mutually connecting the second cover and the second bottom wall as well as the protective device against rupture of the vessel in accordance with the invention.
FIG. 1a is a fragmentary enlarged sectional view of FIG. 1 at the region thereof within the circle shown in broken lines.

Referring now to the drawing and first particularly to FIGS. 1 and 1a thereof, there is shown a large vessel 1 which is of substantially cylindrical shape and stands upright. The vessel 1 is provided with a conventional first cover 1' and a conventional bottom wall 1". A protective device against rupture at the top and bottom ends of the vessel 1 with consequent axially directed forces includes a second cover 2 which is tied to a second bottom wall 3 by tensioning members or tie rods 4.

The cylindrical part of the large vessel 1 is surrounded by a protection device 5 constructed in accordance with the invention, which protects against ruptures of the large vessel 1 that produce forces acting in radial direction to the vessel 1. The protection device 5 is formed of a plurality of inner sheet-metal wrappings 6 and outer sheet metal wrappings 7, which are wound staggered axially relative to one another around and spaced from the vessel 1. In the embodiment illustrated in FIG. 1, two layers of sheet-metal wrappings are shown disposed concentrically or coaxially to each other and staggered in axial direction relative to each other, however, additional layers can also be provided or the wrappings may consist of only a single layer. Furthermore, the outer wrapping may be welded to the one underneath. Each of the inner and outer sheet-metal wrappings 6 and 7 is formed of a wound sheet-metal band or metal sheet. The inner diameter of the inner sheet-metal wrappings 6 is selected so as to be larger than the outer diameter of the large substantially cylindrical vessel 1. Segments 8 of light concrete are disposed as filler in the space between the sheet-metal wrappings 6 and the vessel 1. The light concrete serves both as heat insulation and as a shock absorber in the event of rupture of the vessel 1, and is removable for possible in-service testing.

In contrast to the use of solid rings for protection against rupture the protection device 5 formed of sheet-metal wrappings according to the invention is distinguished by lower transportationand manufacturing costs, by good shock absorption and higher elasticity. The protection device of the invention also affords greater strength or ruggedness than heretofore known devices of this general type because even if individual turns of the sheet metal wrappings or even individual layers of sheet metal wrappings are destroyed, the durability of the overall protective device against rupture of the enclosed vessel is not materially impaired. To manufacture or assemble the protective devide 5 according to the invention, it is advantageous to place a sliding form around the large vessel 1, before the second cover 2 and the second bottom wall 3 have been secured thereon by the tie rods 4, and to wind the inner sheet-metal wrappings 6 around this sliding form. After one inner sheet-metal wrapping 6 is completed, the sliding form is then removable and the next sheet metal wrapping can be applied. A form is then no longer required to produce the outer sheet metal wrappings 7 because they can be wound around the core tube that is formed by the inner sheet metal wrapping 6.

Figure 2:
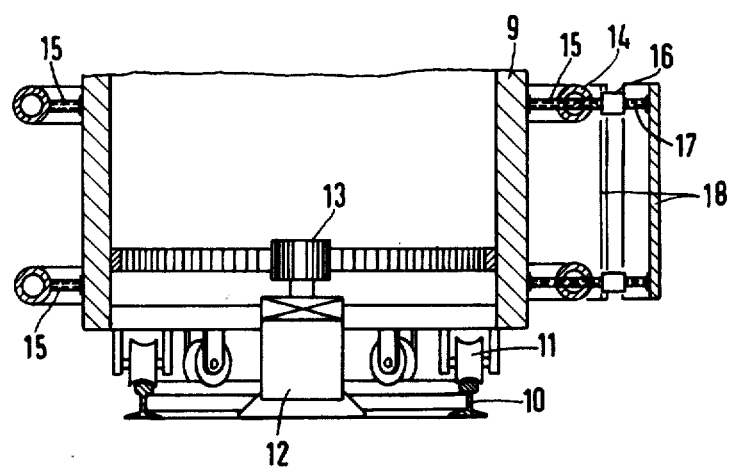
FIG. 2 is a fragmentary sectional view of equipment for carrying out the method according to the invention of manufacturing and assembling the protective device of the invention.

An especially advantageous mode of the method of producing or manufacturing the inner sheet metal wrappings 6, which requires no costly winding machine, is afforded by the device shown in FIG. 2. A rotatable drum 9 is placed adjacent a large substantially cylindrical vessel 1 that is to be provided with the protective device against rupture in accordance with the invention.

The drum 9 is supported on tracks or rails 10, for example, by rollers 11 and can be turned by a drive motor 12 through a suitable gear transmission 13. In order to attain different inner diameters for the sheet metal wrappings that are to be produced, and in order to be able to raise the sheet-metal wrappings after completion thereof, profiled rails 14, which are of tubular cross section in the embodiment shown in FIG. 2, are disposed around the drum 9. The profiled rails 14 are supported or braced at the outer peripheral surface of the drum 9 by means of screws 15, which extend through the profiled rails 14 and are connected through turnbuckles 16 and additonal screws 17 with sheet-metal segments 18.

By turning the drum 9, the sheet-metal wrapping can be wound around the sheet-metal segments 18. The ends of the metal sheet wound into the sheet-metal wrapping can be welded to the wrapping i.e. to the next adjacent turn of the wrapping. The individual superimposed sheets or turns of the sheet-metal wrapping can, furthermore, be connected one to the other by spot welding, so that the sheet metal wrapping constitutes a solid ring formed of several turns or layers. After the sheet-metal wrapping has been completed, the sheet-metal segments 18 can be disengaged from the sheet-metal wrapping by means of the turnbuckles 16. In this regard, it is noted that the sheet metal segments 18 serve exclusively as an added support for the sheet metal wrapping. The sheet-metal wrapping is subsequently placed around the large vessel 1 and suitably wedged concentrically or coaxially to the vessel 1. The sheet-metal segments 18 with the profiled rails 14, the screws 15 and 17 and the turnbuckle 16 can also be used as sliding forms for directly winding the metal sheet around the large vessel.

In order to connect tubes or pipelines at the peripheral surface of the large vessel, openings are cut in the completed protection device against rupture, which has been constructed in accordance with the invention so that the pipelines can be welded to the connecting pieces or unions extending from the vessel. To ensure the sturdiness or rigidty of the protective device against rupture, according to the invention, it is advantageous to place sheet-metal rings around the tubes or pipelines at the openings cut in the sheet-metal wrappings and to weld the rings to the edges of the sheet-metal wrapping surrounding the openings.

I claim:

1. Protective device against rupture of a large cylindrical vessel having a first cover and a first bottom wall and, superimposed respectively thereon, a second cover and a second bottom wall, and further having tensioning members mutually connecting the second cover and the second bottom wall, comprising mutually superimposed rings formed of respective sheet-metal wrappings, each having a plurality of turns wound about the cylindrical part of the vessel between the second cover and second bottom wall thereof, said sheet-metal wrappings have and inner diameter greater than the outer diameter of the large cylindrical vessel, the rupture of which is being protected against, the space between said sheet-metal wrappings and the large cylindrical vessel being filled with light concrete segments.

2. Protective device according to claim 1 including outer sheet-metal wrappings wound around the first-mentioned sheet-metal wrappings and staggered with respect thereto in axial direction.

3. Protective device according to claim 1 wherein the sheet-metal wrappings are formed of respective metal sheets having ends welded to the turn of the sheet-metal wrapping next adjacent thereto.

* * * * *